(12) United States Patent
Olkkonen et al.

(10) Patent No.: US 9,145,936 B2
(45) Date of Patent: Sep. 29, 2015

(54) METHOD AND ARRANGEMENT FOR ADJUSTING A BRAKE

(71) Applicants: Mika Olkkonen, Hyvinkaa (FI); Antti Saarelainen, Espoo (FI)

(72) Inventors: Mika Olkkonen, Hyvinkaa (FI); Antti Saarelainen, Espoo (FI)

(73) Assignee: Kone Corporation, Helsinki (FI)

( * ) Notice: Subject to any disclaimer, the term of this patent is extended or adjusted under 35 U.S.C. 154(b) by 100 days.

(21) Appl. No.: 14/087,483

(22) Filed: Nov. 22, 2013

(65) Prior Publication Data

US 2014/0076675 A1 Mar. 20, 2014

Related U.S. Application Data

(63) Continuation of application No. PCT/FI2012/050553, filed on Jun. 5, 2012.

(30) Foreign Application Priority Data

Jun. 7, 2011 (FI) .................................... 20115547
Jun. 8, 2011 (FI) .................................... 20115561

(51) Int. Cl.
  *F16D 66/00*  (2006.01)
  *F16D 65/00*  (2006.01)
  *B66D 5/30*   (2006.01)

(52) U.S. Cl.
  CPC .............. *F16D 65/0012* (2013.01); *B66D 5/30* (2013.01); *F16D 65/0006* (2013.01)

(58) Field of Classification Search
  CPC ............ F16D 2121/18; F16D 2121/20; F16D 2121/22; F16D 66/00; F16D 2066/005
  USPC ................. 188/161, 163, 171, 1.11 E, 1.11 R
  See application file for complete search history.

(56) References Cited

U.S. PATENT DOCUMENTS

2005/0269872 A1  12/2005 Ralea
2007/0107997 A1   5/2007 Eiband
(Continued)

FOREIGN PATENT DOCUMENTS

CN    1050362 A    4/1991
CN  101052584 A   10/2007
(Continued)

OTHER PUBLICATIONS

European Patent Office Extended Search Report dated Oct. 6, 2014 for EP Application No. 12 79 6354.
(Continued)

*Primary Examiner* — Robert A Siconolfi
*Assistant Examiner* — Vu Q Nguyen
(74) *Attorney, Agent, or Firm* — Harness, Dickey & Pierce, P.L.C.

(57) ABSTRACT

The invention relates to a method and an arrangement for adjusting a brake. The arrangement comprises: a frame part of the brake; a counterpart to be pressed against the frame part; an elastic damping member for damping the noise of the brake, which damping member is configured to form a damping force resisting contact between the countersurfaces of the frame part and of the counterpart, said damping force increasing when the distance between the countersurfaces decreases; and also an adjustment means, for adjusting the damping force formed by the damping member and resisting contact between the countersurfaces of the frame part and of the counterpart.

14 Claims, 4 Drawing Sheets

(56) References Cited

U.S. PATENT DOCUMENTS

| | | |
|---|---|---|
| 2008/0156590 A1 | 7/2008 | Ericson |
| 2012/0175201 A1 | 7/2012 | Lahteenmaki et al. |

FOREIGN PATENT DOCUMENTS

| | | |
|---|---|---|
| CN | 101583511 A | 11/2009 |
| CN | 101875460 A | 11/2010 |
| DE | 102005013142 A1 | 9/2006 |
| JP | 8073143 A | 3/1996 |
| JP | 2005028510 A | 2/2005 |
| WO | WO-2006/049612 A1 | 5/2006 |
| WO | WO-2009/063123 A1 | 5/2009 |
| WO | WO-2011/036335 A1 | 3/2011 |

OTHER PUBLICATIONS

Finnish Search Report dated Oct. 24, 2011 for Finnish Appliction No. 20115561.

International Search Report dated Sep. 13, 2012 for PCT/FI2012/050553.

Written Opinion dated Sep. 13, 2012 for PCT/F12012/050553.

Chinese Office Action dated Nov. 15, 2014 issued in corresponding Chinese Application No. 201280028421.4 (English translation).

METHOD AND ARRANGEMENT FOR ADJUSTING A BRAKE

PRIORITY STATEMENT

This application is a continuation of PCT International Application No. PCT/FI2012/050553 which has an International filing date of Jun. 5, 2012, and which claims priority to Finnish patent application number 20115547 filed Jun. 7, 2011, and Finnish patent application number 20115561, filed Jun. 8, 2011, the entire contents of each which are incorporated herein by reference.

FIELD OF THE INVENTION

The invention relates to solutions for adjusting the noise-damping property of a brake.

BACKGROUND OF THE INVENTION

In elevator hoisting machines, for example, a machinery brake that mechanically connects with a rotating part of the hoisting machine is normally used as a brake device. Structurally, the machinery brake can be e.g. a drum brake or a disc brake.

The machinery brake is activated by disconnecting the current supply of the electromagnet of the machinery brake. When disconnecting the current supply of the electromagnet, the springs in the brake push the armature part, which is provided with a brake pad, against the braking surface of the rotating part to brake the movement of the rotating part of the hoisting machine.

The machinery brake is opened by supplying current to the electromagnet of the machinery brake. The brake opens when the electromagnet pulls the armature part off the braking surface of the rotating part of the hoisting machine by resisting the thrusting force produced by the springs. During a run, current is connected to the electromagnet, in which case the brake is open and the elevator car can move up or down in the elevator hoistway. The brake implementation of an elevator can be e.g. such that the same hoisting machine comprises two or more machinery brakes.

As the current of the electromagnet decreases, the force exerted by the spring finally exceeds the force of attraction of the electromagnet, and the brake activates. Owing to the imbalance of forces the brake pad strikes against the braking surface of the rotating part of the machine. When the brake opens, the electromagnet again exerts on the armature part a force that is in the opposite direction to the spring force. When the force exerted on the armature part by the electromagnet grows to be greater than the spring force, the air gap between the frame part and the armature part closes, and the armature part strikes against the frame part.

Collision of the metallic parts of a brake against each other when the brake is activated or opened may cause a disturbing noise. The noise problem is eliminated whenever possible by adding e.g. a separate damper to the air gap between the frame part and the armature part, which damper when the brake is open prevents direct contact between the metal surfaces of the frame part and of the armature part. A damper can be made of an elastic material, such as rubber or polyurethane; a damper can also be implemented with a separate spring dimensioned for this purpose, such as with a helical spring or cup spring.

The air gap between the frame part and the armature part can vary e.g. owing to manufacturing tolerances of the damper. The force of attraction of the electromagnet decreases as the air gap increases, in which case opening/keeping open the brake requires more current than before. At the same time the opening delay of the brake increases. Incorrect dimensioning of the magnitude of the air gap/the damping force of a damper can, on the other hand, also result in a deterioration of the noise damping property of the brake. Owing to the aforementioned reasons, among others, the operating range of a damper of a brake must be set quite precisely.

Adjustment of the operating range of a damper usually takes place in connection with the manufacturing of the brake. In one embodiment cavities are machined in the countersurface of the armature part on the air gap side, into which cavities elastic dampers are fitted. After this the height of the dampers with respect to the plane of the countersurface is machined to a predefined value. One problem of the solution is, on the other hand, the variation of the material properties of the damper, owing to which also the damping force brought about by the damper varies; also variation caused by the cutting tolerances of the damper as well as by the machining precision of the grinding causes divergence in the damping force/magnitude of the air gap.

In a second embodiment the magnitude of the air gap between the countersurfaces of the frame part of the brake and of the armature part is measured with a dial indicator, and the distance of the dampers from the armature part is adjusted with a tightening bolt in the frame part. Adjustment of the damping is performed as manual work using a dial indicator in the corners of the countersurfaces and at the same time adjusting on an auditory basis the volume of the noise produced by opening of the brake. Adjustment of the damping of the brake is time-consuming and also the quality of the manual work might vary.

Inaccuracy of the adjustment of the damping force results in the damping forces achieved by the different dampers differing from each other. In this case some dampers are loaded more than others, owing to which also the countersurface(s) of the brake is/are loaded unevenly. Owing to the uneven loading, the air gap between the frame part and the armature part is not always equal at the different points of the countersurfaces. Variation of the air gap might, among other things, weaken the force of attraction produced by the electromagnet and, on the other hand, might also cause contact between the countersurfaces of the frame part and of the armature part, in which case the noise damping property of the brake deteriorates.

AIM OF THE INVENTION

Taking the preceding into account, the aim of the invention is to provide a solution to the problem for improving the adjustment of the noise damping property of a brake, preferably in connection with the manufacturing of the brake. To achieve this aim the invention discloses a method according to claim 1 and also an arrangement according to claim 6 for adjusting the noise-damping property of a brake. The preferred embodiments of the invention are described in the dependent claims. Some inventive embodiments and inventive combinations of the various embodiments are also presented in the descriptive section and in the drawings of the present application.

SUMMARY OF THE INVENTION

The invention relates to a method for adjusting the noise-damping property of a brake, using an apparatus which comprises a frame part of the brake, a counterpart to be pressed against the frame part and also an elastic damping member for damping the noise of the brake, which damping member is fitted into the air gap between the countersurfaces of the frame part and of the counterpart. The damping member is configured to be pressed against a countersurface when the frame part and the counterpart are pressed against each other. The damping member is configured, when being pressed against a countersurface, to exert a damping force on the countersurface that increases as the air gap decreases. The apparatus also comprises an adjustment means for adjusting the damping force of the damping member as well as a sensor for measuring the damping force exerted by the damping member on the countersurface of the brake. In the method the frame part and the counterpart are pressed against each, the force effect being exerted on the countersurface of the brake is measured and the force effect being exerted on the countersurface of the brake is adjusted towards the reference value for the force effect by adjusting the damping force of the damping member. By means of the invention the noise-damping property of a brake can be adjusted with the same uninterrupted execution of the adjustment to the final value accurately and independently of any variation in the material properties, machining tolerances, cutting tolerances or other non-idealities of the damper. The invention also enables automation of the adjustment process of the noise-damping property of a brake. The adjustment process can be integrated to become a part of the manufacturing process, in which case also the degree of automation of the manufacturing process of the brake can be increased. In a preferred embodiment of the invention the apparatus comprises a number of elastic damping members, each of which is configured to exert a damping force on a different point of the same countersurface. Furthermore, fitted in connection with each aforementioned damping member is a separate adjustment means, by the aid of which the damping force of the damping member can be adjusted independently of the other damping members. In one embodiment of the invention the apparatus also comprises a number of sensors, each of which is configured to measure the force effect being exerted on the countersurface in question at a different point of the same countersurface. In this case in the method the force effect being exerted on a countersurface at different points of the same countersurface is measured, and the aforementioned force effect being exerted on the different points of the countersurface of the brake is adjusted towards the reference value for the force effect by adjusting the damping force of the damping members. This type of solution is particularly advantageous because adjustment of the damping properties of the different damping members of the same brake can be implemented simultaneously and in the same uninterrupted execution of the adjustment, in which case particularly the adjustment of a brake comprising a number of damping members is simplified and considerably speeded up. By the aid of the adjustment according to the invention of the damping members, an even force distribution is achieved on the area of the countersurface, which improves the accuracy of the adjustment/noise-damping property to be achieved, more particularly if there are more than three damping members (the three damping members having the greatest damping force form a force triangle, which is loaded the most). Owing to the even force distribution also all the dampers are loaded more evenly, in which case the total damping force achieved altogether by the dampers increases, and the dimensioning of the dampers can in some cases even be reduced.

In a preferred embodiment of the invention the aforementioned sensor is connected to the counterpart. The counterpart can be the same as the armature part of the actual brake assembly; in some embodiments the counterpart with sensor forms a separate measuring means, which is used only in connection with the manufacturing of the brake.

In a preferred embodiment of the invention the force effect being exerted on a countersurface of the brake is adjusted in the manufacturing phase. Consequently, the degree of automation of the manufacturing of a brake can be increased.

The arrangement according to the invention for adjusting the noise-damping property of a brake comprises a frame part of the brake, a counterpart to be pressed against the frame part and an elastic damping member for damping the noise of the brake, which damping member is fitted into the air gap between the countersurfaces of the frame part and of the counterpart. The damping member is configured to be pressed against a countersurface when the frame part and the counterpart are pressed against each other. The damping member is configured, when being pressed against a countersurface, to exert a damping force on the countersurface that increases as the air gap decreases. The arrangement also comprises an adjustment means for adjusting the damping force of the damping member as well as a sensor for measuring the damping force exerted by the damping member on the countersurface of the brake. The adjustment means is arranged to adjust the force effect to be measured being exerted on a countersurface towards the reference value for the force effect by adjusting the damping force of a damping member. By means of the invention the noise-damping property of a brake can be adjusted with the same uninterrupted execution of the adjustment to the final value accurately and independently of any variation in the material properties, machining tolerances, cutting tolerances, et cetera, of the damper. The invention also enables automation of the adjustment process of the noise-damping property.

In a preferred embodiment of the invention the adjustment means is configured to move the damping member in an orthogonal direction with respect to the countersurface for adjusting the damping force of the damping member. Consequently, e.g. a screw or a bolt can be used as an adjustment means, by rotating which screw or bolt the damping member in the air gap between the countersurfaces can be shifted towards a countersurface or away from a countersurface.

In a preferred embodiment of the invention the arrangement comprises a drive device for driving the adjustment means and also a control unit, which comprises a regulating loop for adjusting the force effect being exerted on a countersurface of the brake. The control unit is arranged to determine the error variable of the measured force effect being exerted on a countersurface and the reference value for the force effect, and the control unit is arranged to drive the aforementioned drive device in response to the error variable for adjusting the force effect being exerted on a countersurface of the brake towards the reference value for the force effect. The drive device can be e.g. an electrical motorized screwdriver, which rotates a screw or bolt functioning as an adjustment means on the basis of control signals formed by the microcontroller of the control unit. Consequently the control unit can measure the force effect being exerted on a countersurface of the brake, and if the force effect is smaller than the desired reference value the control unit can form a control signal, on the basis of which the adjustment means is rotated in the direction increasing the force effect until the force effect being exerted on the countersurface has increased within the permitted fluctuation range to be the same as the desired reference value for the force effect. If, on the other hand, the force effect is greater than the desired reference value the control unit can form a control signal, on the basis of which the adjustment means is rotated in the direction decreasing the force effect until the force effect has decreased within the permitted fluctuation range to be the same as the desired reference value for the force effect. Thus type of arrangement can be integrated into the manufacturing apparatus of the brake, the apparatus enables the automatic adjustment of the damping property of the brake in connection with the manufacturing process of the brake.

In a preferred embodiment of the invention the arrangement comprises a plurality of elastic damping members, each of which damping members is configured to exert a damping force on a different point of the same countersurface. The arrangement also comprises a plurality of adjustment means, which are fitted in connection with the aforementioned damping members for adjusting the damping forces of the damping members. Further, the arrangement comprises a plurality of sensors, each of which is configured to measure the force effect being exerted on the countersurface at a different point of the countersurface. Each aforementioned adjustment means is arranged to adjust the force effect to be measured that is produced by the damping member and being exerted on the countersurface towards the reference value for the force effect by adjusting the damping force of a damping member. This type of solution is particularly advantageous because adjustment of the damping properties of the different damping members can be implemented simultaneously and in the same uninterrupted execution of the adjustment, in which case particularly the adjustment of a brake comprising a number of damping members is simplified and considerably speeded up. In addition, by the aid of the simultaneous adjustment of different damping members, an even force distribution is achieved on the area of the countersurface, which improves the accuracy of the adjustment as well as the noise-damping property to be achieved. By the aid of the adjustment according to the invention of the damping members, an even force distribution is achieved on the area of the countersurface, which improves the accuracy of the adjustment/noise-damping property to be achieved, more particularly if there are more than three damping members (the three damping members having the greatest damping force form a force triangle, which is loaded the most).

In a preferred embodiment of the invention a shim is fitted into the air gap between the countersurfaces for standardizing the air gap. The shim is e.g. a metal strip of a set thickness; in some embodiments the thickness of the strip is preferably 0.3 millimeters. In a preferred embodiment of the invention the frame part of the brake and the counterpart are pressed against each other such that an air gap determined by the shim remains between the countersurfaces. After this the damping force of the damping member(s) is set in the manner according to the invention. Since the damping force is dependent on the magnitude of the air gap between the countersurfaces, by standardizing the air gap by means of the solution the accuracy of the adjustment of the noise-damping property of a brake can be further improved, fluctuations in quality relating to adjustment of the noise-damping property can be reduced, and also the lead time of the manufacturing process of the brake can be speeded up.

The brake according to the invention is preferably a machinery brake of a hoisting machine of an elevator or a machinery brake of the drive machinery of an escalator or of a travelator.

The invention can be implemented by using as a counterpart a separate measuring means, to which a sensor/sensors is/are fitted. In this case adjustment of the damping property of the brake occurs by pressing the frame part of the brake and the counterpart against each other and also by adjusting the damping force of a damper/some dampers in the manner presented in the invention, after which the counterpart is removed and the armature part belonging to the final brake is fitted in place of the counterpart, said armature part being movably supported on the frame part of the brake. The air gap side countersurface of the armature part of the brake is preferably of the same shape as the counterpart, in which case the damping force of the brake corresponds directly to the value adjusted by means of the counterpart. One advantage of the solution is that the same counterpart/sensors can be used repeatedly e.g. in connection with the manufacturing process of a brake. On the other hand, the invention also relates to solutions wherein a sensor/some sensors is/are connected directly to a prefabricated armature part of the brake and a separate counterpart is not needed during the adjustment of the noise-damping property of the brake.

Taking the preceding into account, for achieving the effect according to the invention the sensor(s) can also be fitted in connection with the air gap side countersurface of the frame part of the brake, instead of or in addition to the air gap side countersurface of the counterpart/armature part, in the manner described above, to measure the force effect being exerted on the air gap side countersurface of the frame part; likewise, the damping member(s) can be configured to exert damping force on the air gap side countersurface of the frame part of the brake. A strain gauge, for example, can be used as a sensor measuring the force effect being exerted on a countersurface.

In some embodiments of the invention the frame part of the brake and the counterpart are pressed against each other, in connection with an adjustment of the noise-damping property of the brake, with a specified constant force; in some embodiments the magnitude of the aforementioned constant force is also used as an aid in determining the reference value for the force effect being exerted on a countersurface of the brake, preferably such that the reference value for the force effect being exerted on a countersurface of the brake is increased when the aforementioned constant force increases and decreases when the aforementioned constant force decreases.

The aforementioned summary, as well as the additional features and additional advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
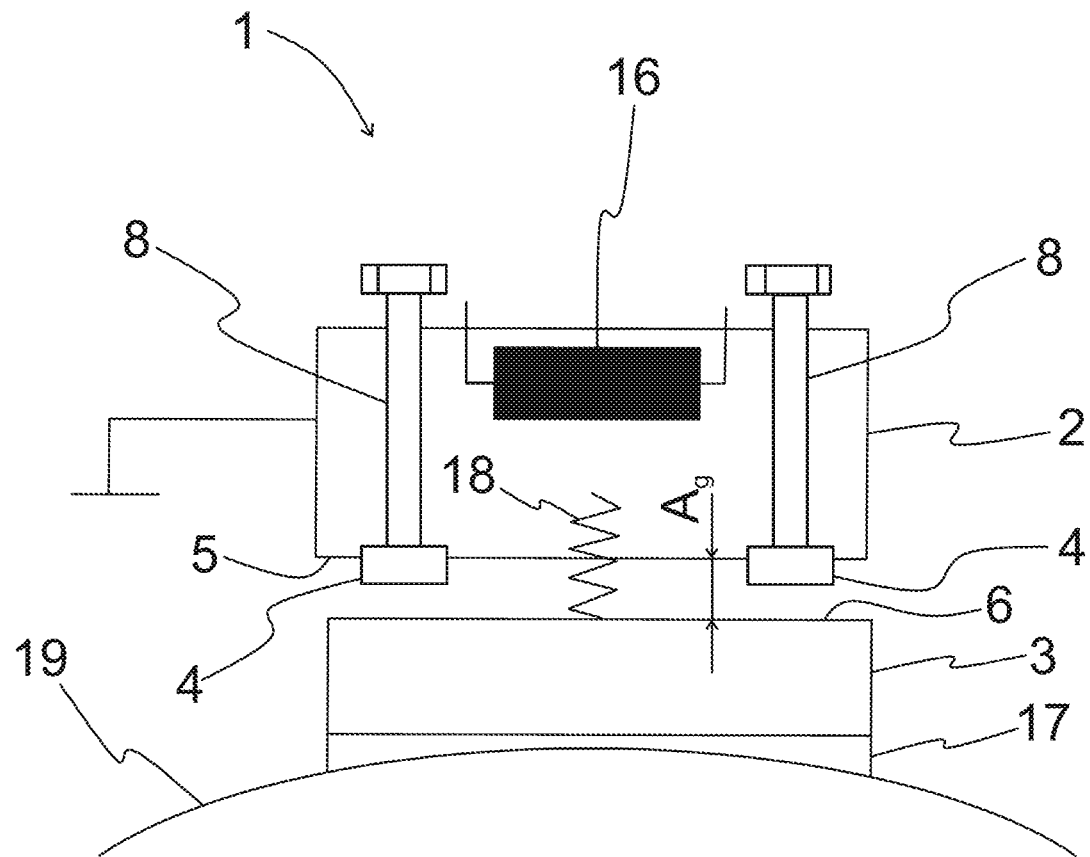
FIG. 1 presents a side view of a brake according to one embodiment of the invention.

The machinery brake 1 of an elevator hoisting machine presented in FIG. 1 comprises a frame part 2 fixed to a stationary part (not shown in FIG. 1) of the hoisting machine as well as, movably supported on the frame part 2, an armature part 3 comprising a brake pad 17. In the frame part 2 is an electromagnet, which comprises a magnetizing coil 16. The armature part 3 of the machinery brake is movably supported on the frame part 2, e.g. with a pin (not presented in FIG. 1) such that the armature part 3 is able to move in relation to the frame part 2 along the path of movement determined by the pin such that the distance between the countersurfaces 5, 6 of the armature part 3 and the frame part 2, i.e. the air gap $A_g$, changes. The springs 18 exert a thrusting force between the frame part 2 and the armature part 3 such that the brake 1 is activated to brake the movement of a rotating part of the hoisting machine when the springs 18 press the brake pad 17 against the braking surface 19 of the rotating part of the hoisting machine. The operating range of the springs 18 is dimensioned such that the thrusting force produced by the springs 18 is constant in relation to the path of movement of the armature part 3 or the thrusting force increases only a little when the brake 1 opens. The brake is opened by supplying current to the magnetizing coil 16 of the electromagnet; the current traveling in the coil brings about a force of attraction between the frame part 2 and the armature part 3, pulling the armature part 3 off the braking surface 19 and towards the frame part 2 by resisting the thrusting force of the springs 18.

For improving the noise-damping property of a brake 1 elastic dampers 4, e.g. O-rings made of rubber or polyurethane, are fitted into the air gap $A_g$ between the countersurfaces 5, 6 of the frame part 2 and of the armature part 3, near the corners of the brake 1, which dampers are compressed when the frame part 2 and the armature part 3 press against each other. When it is compressed, a damper 4 forms a damping force $F_d$ damping the noise of the brake and resisting direct contact between the countersurfaces 5, 6. Additionally, a tightening bolt 8 is fitted in connection with each damper 4 of the frame part 2, the washer at the end of which bolt engages with the damper 4 such that by screwing the tightening bolt 8 the orthogonal distance of the damper 4 from the countersurface 6 of the armature part 3 can be adjusted, said countersurface being on the side of the air gap $A_g$ of the brake. By adjusting the distance of the damper 4 from the countersurface 6 of the armature part 3 on the side of the air gap $A_g$ of the brake, the magnitude of the damping force $F_d$ produced by the damper can be changed.

Figure 5:
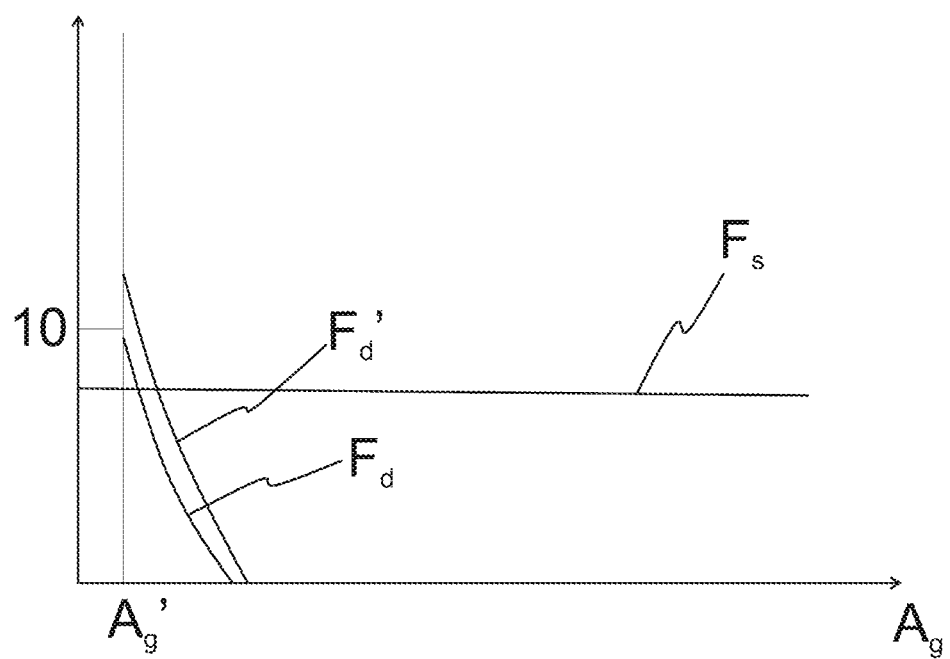
FIG. 5 illustrates a graph of the damping force $F_d$ of a damping member according one embodiment of the invention, as a function of the air gap $A_g$ of the brake.

FIG. 5 illustrates a graph of the damping force $F_d$ according to the embodiment of FIG. 1, as a function of the air gap $A_g$. A graph of the spring force $F_s$ of the spring 18 is marked in FIG. 5; according to the graph, the spring force $F_s$ remains almost constant as the air gap $A_g$ changes. Also, the graph of the damping force $F_d$ produced by a damper is marked in FIG. 5, which graph is summed with the graph of the spring force $F_s$ such that the resultant of the damping force $F_d$ and the spring force $F_s$ forms the total force pushing the frame part 2 and the armature part 3 apart from each other. According to FIG. 5, the damping force $F_d$ starts to act only when the air gap $A_g$ has decreased so much that the damper 4 comes into contact with the air gap side countersurface 6 of the armature part 3. After this, when the air gap $A_g$ further decreases the damper 4 starts to become compressed, in which case the damping force $F_d$ produced by the damper sharply increases. Owing to the sharp increase in the damping force $F_d$, the damper 4 effectively prevents contact between the countersurfaces 5, 6 of the frame part 2 and of the armature part 3, i.e. a situation in which the air gap $A_g$ would go to zero. The graph $F_d'$ of the damping force after the damper 4 has shifted closer to the air gap $A_g$ side countersurface 6 of the armature part 3 is also marked in FIG. 5. According to FIG. 5, the shifting of the damper 4 closer to the countersurface 6 of the armature part 3 is caused by the damping force $F_d'$ increasing; also in this case the damping force of the damper 4 starts to act at an already greater value of the air gap $A_g$.

Figure 2:
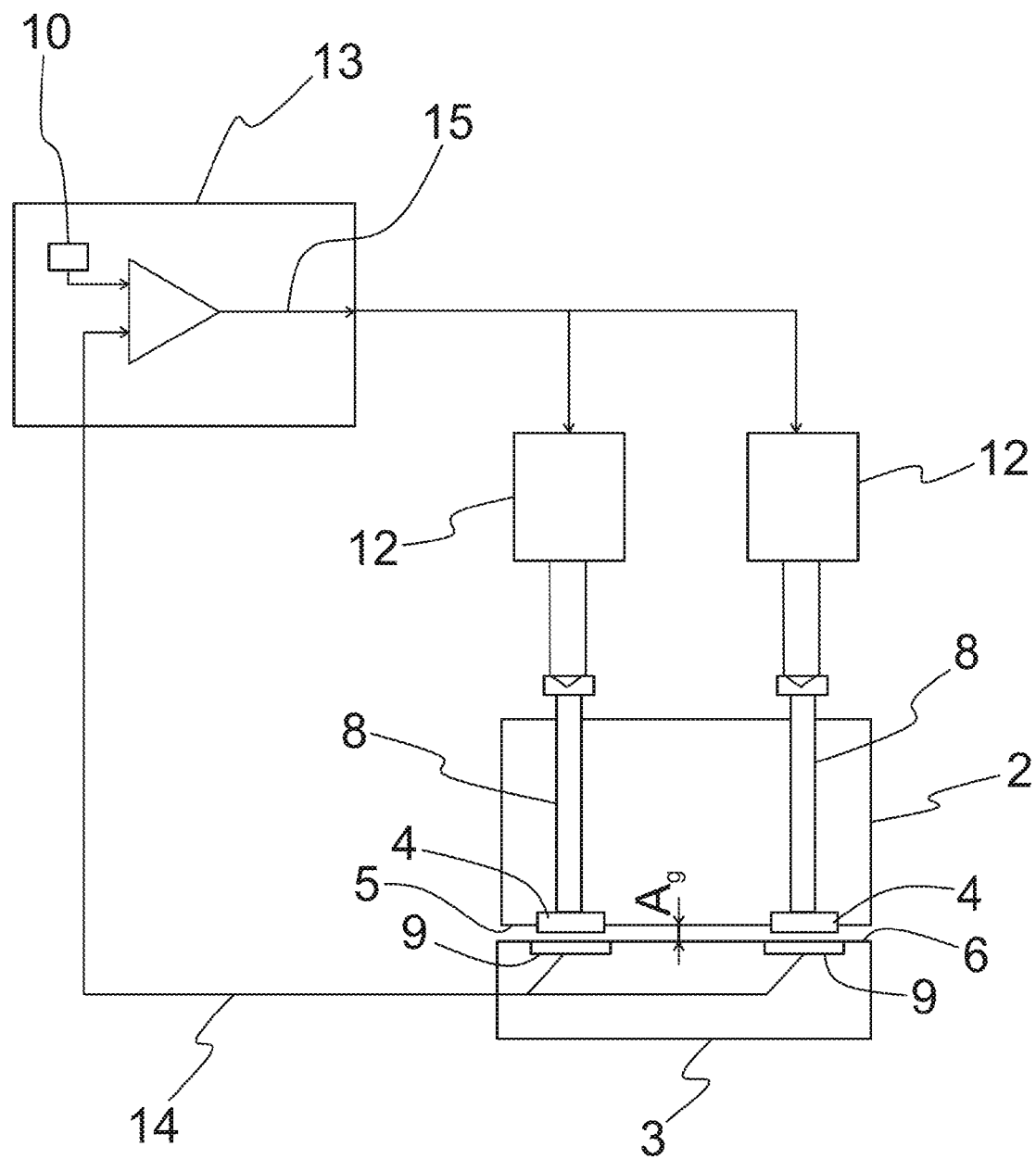
FIG. 2 presents an arrangement according to one embodiment of the invention for adjusting a brake.
Figure 3:
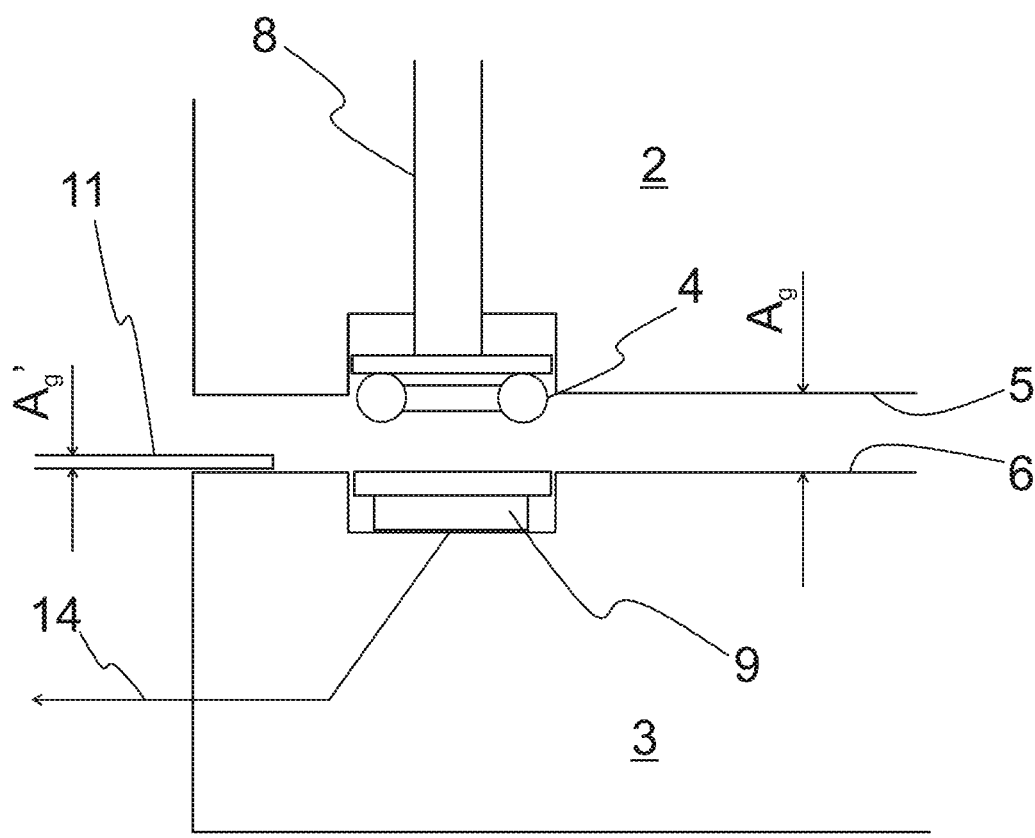
FIG. 3 presents an apparatus according to one embodiment of the invention.
Figure 4:
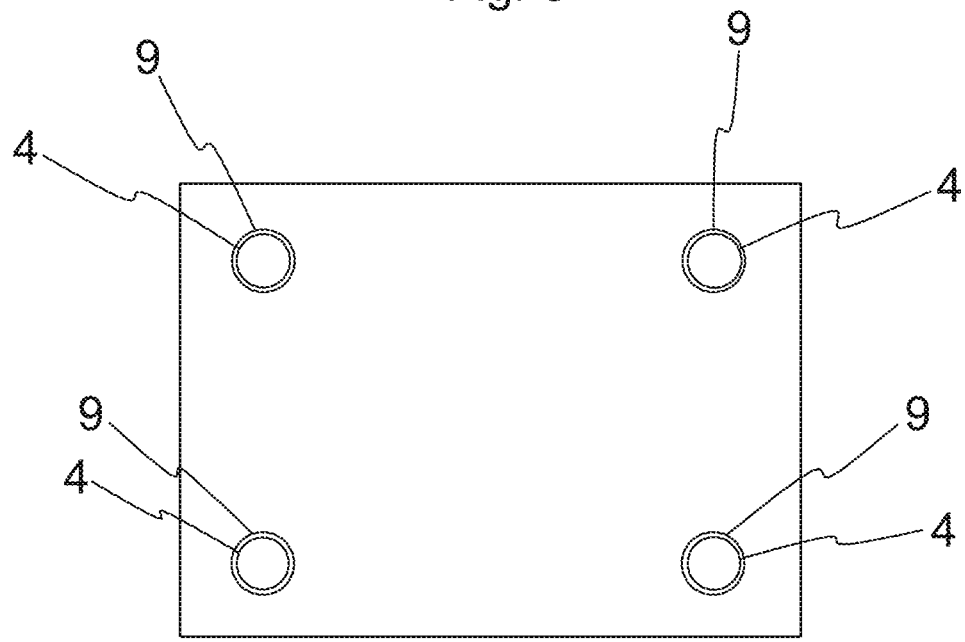
FIG. 4 presents a top view of a counterpart according to one embodiment of the invention.

FIG. 2 presents an arrangement for adjusting the noise-damping property of a brake 1 according to FIG. 1 in connection with the manufacturing process of the brake. Before the assembly of the brake of FIG. 1, the damping forces $F_d$ of the dampers 4 of the brake 1 are set in the manner presented below. The arrangement comprises a counterpart 3, which when adjusting the damping force $F_d$ of the brake 1 is pressed against the frame part 2 of the brake. The force for pressing the counterpart 3 against the frame part 2 is obtained by supplying current to the electromagnet in the frame part 2 of the brake; on the other hand, the force needed could be produced also e.g. with a separate compression means to be connected to the counterpart 3 and to the frame part 2 and pressing the frame part 2 and the counterpart 3 against each other. The air gap $A_g$ side countersurface 6 of the counterpart 3 is of the same shape as the air gap side countersurface 6 of the armature part 3 of the brake belonging to the final brake assembly. In addition, cavities are machined in the countersurface 6 of the counterpart 3, which cavities are disposed at the point of the dampers 4, when the frame part 2 and the counterpart 3 are pressed against each other, see FIG. 5. Strain gauge sensors 9, for measuring the force effect exerted by the dampers 4 on the countersurface 6 are fitted into the cavities machined in the countersurface 6 of the counterpart 3; the fitting of one such strain gauge sensor 9 is presented in more detail in FIG. 3. According to FIG. 3, when adjusting the damping force of a damper 4 a shim 11 is fitted into the air gap between the countersurfaces 5, 6 of the counterpart 3 and of the frame part 2. The thickness of the shim 11 determines the magnitude of the air gap $A_g$ when the frame part 2 and the counterpart 3 are pressed against each other. In FIG. 5 the magnitude of the damping force $F_d$ is presented with the value $A_g'$ of the air gap set by the shim 11. The damping force increases to the value $F_d'$ when the damper 4 is shifted towards the countersurface 6 of the counterpart and decreases to the value $F_d$ when the damper 4 moves away from the countersurface 6.

In the arrangement of FIG. 2 a control unit 13 receives measuring data 14 from the strain gauge sensors 9 and compares the measuring data 14 to the reference value 10, recorded in the memory of the control unit 13, for the force effect being exerted on the countersurface 6. On the basis of the comparison, the control unit 13 controls electronic screwdrivers 12, which rotate tightening bolts 8 such that the force effect 14 exerted on the countersurface 6 of a damper 4 approaches the reference value 10 for the force effect. In this embodiment of the invention the damping force/force effect 14 of all the dampers are adjusted simultaneously; on the other hand, the invention could also be implemented by adjusting the damping forces of the different dampers 4 one at a time to the reference value 10 for the force effect. When the measured damping forces 14 of the dampers 4 have been adjusted within the permitted fluctuation range to correspond to the desired reference value 10 for the force effect, the control unit 13 forms a signal with which the control unit 13 notifies that the adjustment process of the damping force is ready. After this the frame part 2 of the brake, the damping forces $F_d$ of the dampers 4 in which have just been set by means of the tightening screws 8, is detached, and the brake is assembled by connecting the frame part 2 with its dampers 4 to the armature part 3 of the brake to become the final brake assembly. In the adjustment of the damping force of each damper 4, the same reference value 10 for the force effect is used. The magnitude of the reference value 10 for the force effect is selected to correspond to the damping force $F_d$ that when the brake opens is sufficient to prevent contact between the countersurfaces 5, 6.

In a second embodiment of the invention the strain gauge sensors 9 are connected to cavities machined in the armature part 3 of the brake, in which case there is no need for a separate counterpart 3 during adjustment of the damping force. An advantage in this case is that the braking force of a final fully assembled brake assembly can be directly adjusted and also that the adjustment can be repeated, if necessary, also later during the lifecycle of the brake; a drawback, of course, is inter alia the extra cost of the finished brake caused by the strain gauge sensor 9.

The solution according to the invention is suited to be used in connection with, inter alia, drum brakes and disc brakes.

It is obvious to the person skilled in the art that the different embodiments of the invention are not limited to the examples described above, but that they may be varied within the scope of the claims presented below.

The invention claimed is:

1. A method for adjusting the noise-damping property of a brake,
    the apparatus comprising:
    a frame part of the brake;
    a counterpart to be pressed against the frame part;
    an elastic damping member for damping the noise of the brake, which damping member is fitted into an air gap between the frame part and the counterpart;
    and which damping member is configured to be pressed against a countersurface when the frame part and the counterpart are pressed against each other;
    and which damping member, when being pressed against the countersurface, is configured to exert a damping force on the countersurface that increases as the air gap decreases;
    and which apparatus comprises an adjustment means for adjusting the damping force of the damping member;
    wherein the apparatus comprises a sensor for measuring a force effect being exerted on the countersurface of the brake;
    and that in the method:
        the frame part and the counterpart are pressed against each other,
        the force effect being exerted on the countersurface of the brake is measured by the sensor,
        the force effect being exerted on the countersurface of the brake is adjusted towards a reference value for the force effect by adjusting the damping force of the damping member via the adjustment means.

2. The method according to claim 1, wherein the aforementioned sensor is connected to the counterpart.

3. The method according to claim 1, wherein:
    the damping force of the damping member is adjusted by shifting the damping member in an orthogonal direction with respect to the countersurface.

4. The method according to claim 1, wherein:
    the force effect being exerted on the countersurface of the brake is adjusted in a manufacturing phase.

5. The method according to claim 1, wherein the apparatus comprises a shim for standardizing the air gap.

6. An arrangement for adjusting the noise-damping property of a brake, said arrangement comprising:
    a frame part of the brake;
    a counterpart to be pressed against the frame part;
    an elastic damping member for damping the noise of the brake, which damping member is fitted into an air gap between the frame part and the counterpart;
    and which damping member is configured to be pressed against the countersurface when the frame part and the counterpart are pressed against each other;
    and which damping member, when being pressed against the countersurface, is configured to exert a damping force on the countersurface that increases as the air gap decreases;
    and which arrangement comprises an adjustment means for adjusting the damping force of the damping member;
    wherein the arrangement comprises a sensor for measuring a force effect being exerted on the countersurface of the brake;
    and in that the adjustment means is arranged to adjust the force effect to be measured being exerted on the countersurface towards a reference value for the force effect by adjusting the damping force of the damping member.

7. The arrangement according to claim 6, wherein the aforementioned sensor is connected to the counterpart.

8. The arrangement according to claim 6, wherein the adjustment means is configured to move the damping member in an orthogonal direction with respect to the countersurface for adjusting the damping force of the damping member.

9. The arrangement according to claim 6, wherein the arrangement comprises a drive device for driving the adjustment means.

10. The arrangement according to claim 9, wherein the arrangement comprises a control unit, which comprises a regulating loop for adjusting the force effect being exerted on a countersurface of the brake.

11. The arrangement according to claim 10, wherein the control unit is arranged to determine an error variable of the measured force effect being exerted on the countersurface and the reference value for the force effect;
    and in that the control unit is arranged to drive the aforementioned drive device in response to the error variable for adjusting the force effect being exerted on the countersurface of the brake towards the reference value for the force effect.

12. The arrangement according to claim 6, wherein the arrangement is fitted into a manufacturing apparatus of the brake.

13. The arrangement according to claim 6, wherein the apparatus comprises a plurality of elastic damping members, each of which damping members is configured to exert a damping force on a different point of the same countersurface;
    and in that the arrangement comprises a plurality of adjustment means, which is fitted in connection with the aforementioned damping members for adjusting the damping forces of the damping members;
    and in that the arrangement comprises a plurality of sensors, each of which is configured to measure the force effect being exerted on the countersurface at a different point of the countersurface;
    and in that each aforementioned adjustment means is arranged to adjust the force effect to be measured, said force effect being produced by each damping member and exerted on the countersurface, towards the reference value for the force effect by adjusting the damping force of each damping member.

14. The arrangement according to claim 6, wherein the arrangement comprises a shim for standardizing the air gap.

* * * * *